(12) United States Patent
Bodog et al.

(10) Patent No.: US 9,143,963 B2
(45) Date of Patent: Sep. 22, 2015

(54) CORRELATING RADIO LINK FAILURE AND MINIMIZATION OF DRIVE TEST REPORTS

(75) Inventors: Gyula Bodog, Budapest (HU); Anatoly Andrianov, Schaumburg, IL (US); Sean Kelley, Hoffman Estates, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 321 days.

(21) Appl. No.: 13/572,498

(22) Filed: Aug. 10, 2012

(65) Prior Publication Data
US 2014/0043982 A1 Feb. 13, 2014

(51) Int. Cl.
*H04L 12/26* (2006.01)
*H04W 24/08* (2009.01)
(52) U.S. Cl.
CPC ..................................... *H04W 24/08* (2013.01)
(58) Field of Classification Search
CPC ....................................................... H04L 12/26
See application file for complete search history.

(56) References Cited

U.S. PATENT DOCUMENTS

2012/0127876 A1* 5/2012 Hunukumbure et al. ...... 370/252
2012/0157156 A1* 6/2012 Han et al. ...................... 455/525

OTHER PUBLICATIONS

3GPP TSG-RAN3 Meeting #76, R3-121450, "LS on Enhancements to the LTE RLF Report from the UE", May 21-26, 2012, 1 page.
S5-113650; 3GPP TSG SA WG5 (Telecom Management) Meeting #80; Nokia Siemens Networks; "Correlation of MDT and RLF data"; Nov. 14-18, 2011; San Francisco, USA.
R2-110193; 3GPP TSG-RAN WG2 Meeting #72bis; MediaTek; "RLF report Remaining issues"; Dublin, Ireland, Jan. 17-21, 2011.
International Search Report application No. PCT/EP2013/061234 dated Mar. 11, 2014.

* cited by examiner

*Primary Examiner* — Sulaiman Nooristany
(74) *Attorney, Agent, or Firm* — Squire Patton Boggs (US) LLP

(57) ABSTRACT

Various communication systems may benefit from appropriate correlation of failure reports. For example, communication systems of the third generation partnership project (3GPP) may benefit from correlating radio link failure and minimization of drive test reports, particularly with respect to self-organized networks mobility robustness optimization.

19 Claims, 3 Drawing Sheets

CORRELATING RADIO LINK FAILURE AND MINIMIZATION OF DRIVE TEST REPORTS

BACKGROUND

1. Field

Various communication systems may benefit from appropriate correlation of failure reports. For example, communication systems of the third generation partnership project (3GPP) may benefit from correlating radio link failure and minimization of drive test reports, particularly with respect to self-organized networks mobility robustness optimization.

2. Description of the Related Art

Radio Link Failure (RLF) reporting was introduced in third generation partnership project (3GPP) release 9 (Rel-9) under Self Organized Networks Mobility Robustness Optimization (SON MRO) feature. User equipment (UE) may experience a radio link failure either when moving from a first cell, Cell A, to a second cell, Cell B, attempting a hand off, or when experiencing a coverage hole. On experiencing radio link failure, a user equipment can log a snapshot of the last monitored radio frequency (RF) condition along with other information and stores it as a radio link failure report. Upon (re)establishing a connection to a cell, the user equipment can indicate the availability of a radio link failure report to the cell, which can retrieve the radio link failure report from the user equipment. If the cell is different from the cell where the radio link failure occurred, the new cell can forward this radio link failure report back to the cell where radio link failure occurred, as part of the X2 radio link failure indication message. The cell where radio link failure has occurred processes the radio link failure report as an input to the distributed SON MRO algorithm.

In 3GPP release 10 (Rel-10) the additional value of radio link failure reports to other features beside the distributed SON MRO were identified, which resulted in certain changes to the radio link failure reports content, such as addition of location information and various cell identifiers, and making their support mandatory on the UE. The radio link failure reports can be used in the detection of coverage holes and handover failure boundaries, as well as in assisting mobility drive tests and the like.

As of 3GPP Rel-10, two versions of the radio link failure reports exist: a release 9 version that does not contain location information and may only be interpreted by the cell where radio link failure has occurred; and a release 10 version that contains additional attributes such as location information and cell identities making it useful for centralized self-organized network (cSON).

Correlation requirement for radio link failure reporting and MDT reporting may be met, for example, by combining MDT and radio link failure to a single trace job. This approach, however, also imposes a user consent requirement on the radio link failure data.

SUMMARY

According to certain embodiments, a method includes collecting a plurality of a radio failure reports. The method also includes collecting a plurality of private data reports. First trace jobs for collecting the plurality of private data reports are separate from second trace jobs for collecting the radio failure reports. The method further includes correlating at least one of the radio failure reports to at least one of the private data reports.

In certain embodiments, an apparatus includes at least one processor and at least one memory including computer program code. The at least one memory and the computer program code are configured to, with the at least one processor, cause the apparatus at least to collect a plurality of a radio failure reports. The at least one memory and the computer program code are also configured to, with the at least one processor, cause the apparatus at least to collect a plurality of private data reports. First trace jobs for collecting the plurality of private data reports are separate from second trace jobs for collecting the radio failure reports. The at least one memory and the computer program code are further configured to, with the at least one processor, cause the apparatus at least to correlate at least one of the radio failure reports to at least one of the private data reports.

An apparatus, according to certain embodiments, includes collecting means for collecting a plurality of a radio failure reports. The apparatus also includes collection means for collecting a plurality of private data reports. First trace jobs for collecting the plurality of private data reports are separate from second trace jobs for collecting the radio failure reports. The apparatus further includes correlating at least one of the radio failure reports to at least one of the private data reports.

A non-transitory computer readable medium is, in certain embodiments, encoded with instructions that, when executed in hardware, perform a process. The process includes collecting a plurality of a radio failure reports. The process also includes collecting a plurality of private data reports, wherein first trace jobs for collecting the plurality of private data reports are separate from second trace jobs for collecting the radio failure reports. The process further includes correlating at least one of the radio failure reports to at least one of the private data reports.

According to certain embodiments, a method includes providing a radio failure report to a network element. The method also includes providing a private data report to the network element. The radio failure report and the private data report are configured to be correlated with one another.

In certain embodiments, an apparatus includes at least one processor and at least one memory including computer program code. The at least one memory and the computer program code are configured to, with the at least one processor, cause the apparatus at least to provide a radio failure report to a network element. The at least one memory and the computer program code are also configured to, with the at least one processor, cause the apparatus at least to provide a private data report to the network element. The radio failure report and the private data report are configured to be correlated with one another.

An apparatus, according to certain embodiments, includes providing means for providing a radio failure report to a network element. The apparatus also includes provision means for providing a private data report to the network element. The radio failure report and the private data report are configured to be correlated with one another.

A non-transitory computer readable medium is, in certain embodiments, encoded with instructions that, when executed in hardware, perform a process. The process includes providing a radio failure report to a network element. The process also includes providing a private data report to the network element. The radio failure report and the private data report are configured to be correlated with one another.

BRIEF DESCRIPTION OF THE DRAWINGS

For proper understanding of the invention, reference should be made to the accompanying drawings, wherein.

DETAILED DESCRIPTION

Figure 1:
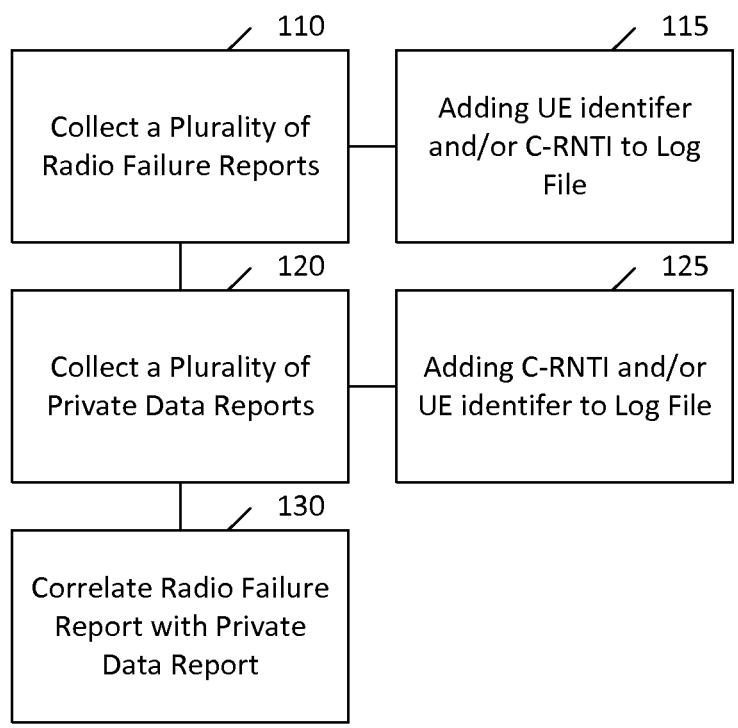
FIG. 1 illustrates a method according to certain embodiments.

For a centralized self-organized network (SON) function, not only the radio link failure reports itself, but also minimization of drive test (MDT) data that has been collected from the same user equipment (UE) may be combined. Thus, both MDT and radio link failure data can be collected and analyzed together.

Private data, such as MDT data, may require user consent before data collection or use. By contrast, radio link failure report collection does not require such consent. If radio link failure reports are collected as part of an MDT job, then the radio link failure report collection may also be tied to user consent. Therefore, to avoid user consent requirement for radio link failure report collection, a separate trace job can be created. The separate trace job, however, conventionally prevents the possibility of correlating the MDT and radio link failure reports that are collected from the same UE and same connection.

In certain embodiment, radio link failure (RLF) reports and minimization of drive test (MDT) reports are collected by separate trace jobs in order to allow radio link failure report collection without user consent. However, there are certain use cases, for example, centralized cell change order (CCO) where the MDT and radio link failure reports together in a correlated manner provide valuable information/input to a system that analyzes the reports.

More particularly, certain embodiments use C-RNTI, timestamp, and cell id for correlation of MDT and radio link failure reports, while maintaining a separate trace job for collection of radio link failure and MDT reports.

Using C-RNTI as a key for correlation can involve various aspects. An eNB may know the C-RNTI of the user equipment (UE) reporting the immediate MDT measurements, and it may be added to the MDT log file. The eNB may also know the C-RNTI of the UE reporting a radio link failure during re-establishment, using Rel-9 reporting. This may also be added to the log file. Furthermore, the UE can add a radio link failure timestamp information element (IE) to the radio link failure report.

The combination of C-RNTI and a timestamp can uniquely, or at least uniquely enough, identify the UE for correlation of radio link failure and MDT. In certain cases, a UE may report radio link failure, but not at the re-establishment attempt, using Rel-10 reporting. In this case, the "old" C-RNTI may not automatically be known to the eNB. Thus, the UE can add an information element for "last C-RNTI before the failure" to the radio link failure report. Thus, with the two IEs in the radio link failure report, "timestamp" and "last C-RNTI", as well as the MDT C-RNTI recorded by the eNB, the correlation may be possible.

Thus, certain embodiments include C-RNTI to the MDT reports and radio link failure reports. Moreover, certain embodiments include a user equipment (UE) timestamp in the radio link failure report. If both reports contain the information together with the cell_ID and the timestamp, correlation is possible at the TCE utilizing the C-RNTI, timestamp and cell_ID.

FIG. 1 illustrates a method according to certain embodiments. The method of FIG. 1 may be performed by a network element such as, for example, an access point, base station, eNode B (eNB), or the like. The method of FIG. 1 may also be performed by a core network element.

As shown in FIG. 1, a method can include, at 110, collecting a plurality of a radio failure reports. The radio failure reports can include at least one of radio link failure reports, handover failure reports, or radio resource control connection establishment failure reports. Other kinds of radio failure reports are not excluded. The collecting the plurality of radio failure reports can include, at 115, adding to a log file at least one of a user equipment identifier or a cell radio network temporary identifier.

The method can also include, at 120, collecting a plurality of private data reports, wherein first trace jobs for collecting the plurality of private data reports are separate from second trace jobs for collecting the radio failure reports. The private data reports can include at least one of minimization of drive test reports or measurement logs. Minimization of drive test reports can be considered one kind of measurement log. The collecting the plurality of private data reports can include, at 125, adding at least one cell radio network temporary identifier or at least one user equipment identifier to a log file.

The method can further include, at 130, correlating at least one of the radio failure reports to at least one of the private data reports. The correlating can be based on at least one cell radio network temporary identifier and at least one timestamp.

Figure 2:
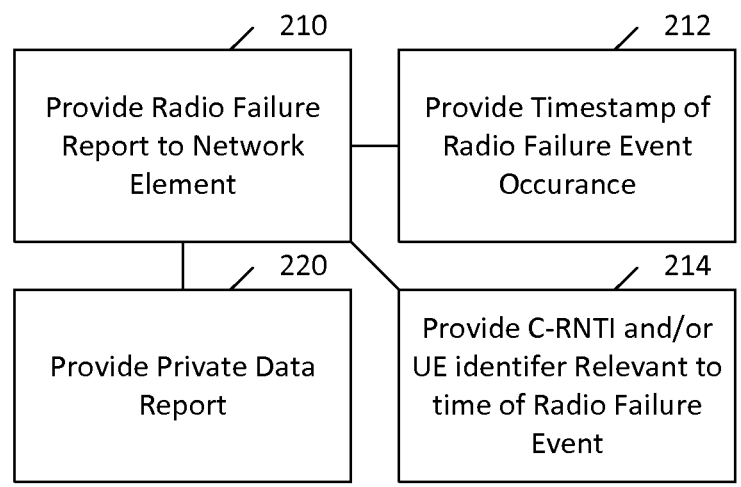
FIG. 2 illustrates another method according to certain embodiments.

FIG. 2 illustrates another method according to certain embodiments. The method of FIG. 2 may be performed by a user equipment, such as a terminal device, smart phone, meter device, personal digital assistant, or tablet computer. Other devices that connect to a radio access network may also perform this method.

As shown in FIG. 2, a method can include, at 210, providing a radio failure report to a network element. The providing the radio failure report can include, at 212, providing a timestamp corresponding to a time when a reported event of the radio failure report occurred. The providing the radio failure report can also include, at 214, providing at least one of a cell radio network temporary identifier or a user equipment identifier, the cell radio network temporary identifier or the user equipment identifier corresponding to a time when a reported event of the radio failure report occurred. In this case, the C-RNTI can corresponds to the UE Identity at a particular time. The C-RNTI can be dynamically assigned to UEs each time they enter connected mode, and may eventually be reused for different UEs. The radio failure report can include at least one of a radio link failure report, a handover failure report, or a radio resource control connection establishment failure report.

The method can also include, at 220, providing a private data report to the network element. The radio failure report and the private data report can be configured to be correlated with one another. The private data report may be, for example, a minimization of drive test report.

Figure 3:
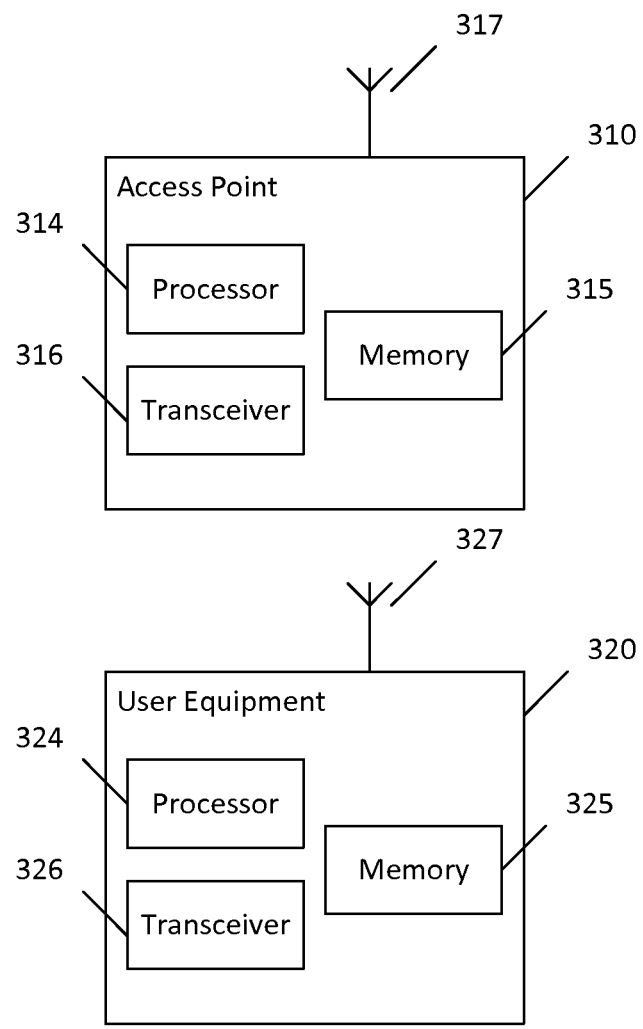
FIG. 3 illustrates a system according to certain embodiments.

FIG. 3 illustrates a system according to certain embodiments of the invention. In one embodiment, a system may comprise several devices, such as, for example, access point 310 and UE 320. The system may comprise more than one UE 320 and more than one access point 310, although only one of each is shown for the purposes of illustration. The system may also involve only at least two UEs 320 or only at least two access points 310. An access point can be a base station, eNode B (eNB) or other network access element. Each of these devices may comprise at least one processor, respectively indicated as 314 and 324. At least one memory may be provided in each device, and indicated as 315 and 325, respectively. The memory may comprise computer program instructions or computer code contained therein. One or more transceiver 316 and 326 may be provided, and each device may also comprise an antenna, respectively illustrated as 317 and 327. Although only one antenna each is shown, many antennas and multiple antenna elements may be provided to each of the devices. Other configurations of these devices, for example, may be provided. For example, access point 310 and UE 320 may be additionally configured for wired communication, in addition to wireless communication, and in such a case antennas 317 and 327 may illustrate any form of communication hardware, without being limited to merely an antenna.

Transceivers 316 and 326 may each, independently, be a transmitter, a receiver, or both a transmitter and a receiver, or a unit or device that may be configured both for transmission and reception.

Processors 314 and 324 may be embodied by any computational or data processing device, such as a central processing unit (CPU), application specific integrated circuit (ASIC), or comparable device. The processors may be implemented as a single controller, or a plurality of controllers or processors.

Memories 315 and 325 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language.

The memory and the computer program instructions may be configured, with the processor for the particular device, to cause a hardware apparatus such as access point 310 and UE 320, to perform any of the processes described above (see, for example, FIGS. 1 and 2). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

Furthermore, although FIG. 3 illustrates a system including an access point 310 and a UE 320, embodiments of the invention may be applicable to other configurations, and configurations involving additional elements, as illustrated and discussed herein. For example, multiple user equipment devices and multiple access points may be present, or other nodes providing similar functionality, such as relays which may receive data from an access point and forward the data to a UE and may implement both functionality of the UE and functionality of the access point.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. For example, the same correlation solution described above with reference to radio link failure reports can also be used for the radio resource control (RRC) connection establishment failure reporting and handover failure reporting. In order to determine the metes and bounds of the invention, therefore, reference should be made to the appended claims.

We claim:

1. A method, comprising:
   collecting, by a core network element, a plurality of anonymous radio failure reports, wherein each radio failure report comprises a cell radio network temporary identifier of a corresponding user equipment and a timestamp corresponding to a time when a reported event of the radio failure report occurred;
   collecting a plurality of private data reports, each comprising a cell radio network temporary identifier of a corresponding user equipment, wherein first trace jobs for collecting the plurality of private data reports are separate from second trace jobs for collecting the radio failure reports, making the radio failure reports and private data reports separate and initially unassociated upon reception; and
   determining which radio failure report and private data report from the plurality of radio failure reports and private data reports are from a same user equipment based on the received cell radio network temporary identifiers and the timestamps;
   wherein the cell radio network temporary identifier is a last cell radio network temporary identifier before the time when the reported event of the radio failure report occurred.

2. The method of claim 1, wherein the radio failure reports comprise at least one of radio link failure reports, handover failure reports, or radio resource control connection establishment failure reports.

3. The method of claim 1, wherein the private data reports comprise at least one of minimization of drive test reports or measurement logs.

4. The method of claim 1, wherein the collecting the plurality of radio failure reports comprises adding to a log file at least one of a user equipment identifier or a cell radio network temporary identifier.

5. The method of claim 1, wherein the collecting the plurality of private data reports comprises adding at least one cell radio network temporary identifier or at least one user equipment identifier to a log file.

6. A method, comprising:
   providing, by a user equipment, a radio failure report to a core network element wherein the radio failure report comprises a cell radio network temporary identifier of the user equipment and a timestamp corresponding to a time when a reported event of the radio failure report occurred, wherein the radio failure report comprises a cell radio network temporary identifier of the user equipment and a timestamp corresponding to a time when a reported event of the radio failure report occurred;
   providing a private data report to the core network element, the private data report comprising a cell radio network temporary identifier of the user equipment, wherein the radio failure report and the private data report are configured to be correlated with one another at the core network element in order to determine which radio failure report and private data report from the plurality of radio failure reports and private data reports are from a same user equipment based on the received cell radio network temporary identifiers and the timestamps, wherein the radio failure report and the private data report are collected in separate trace jobs, making the radio failure reports and private data reports separate and initially unassociated upon reception at the core network element;

wherein the cell radio network temporary identifier is a last cell radio network temporary identifier before the time when the reported event of the radio failure report occurred.

7. The method of claim 6, wherein the providing the radio failure report comprises providing a user equipment identifier, the user equipment identifier corresponding to the time when the reported event of the radio failure report occurred.

8. The method of claim 6, wherein the radio failure report comprises at least one of a radio link failure report, a handover failure report, or a radio resource control connection establishment failure report.

9. An apparatus, comprising: at least one processor; and at least one memory including computer program code,
wherein the at least one memory and the computer program code are configured to, with
the at least one processor, cause the apparatus at least to
collect, by a core network element, a plurality of a-anonymous radio failure reports~wherein each radio failure report comprises a cell radio network temporary identifier of a corresponding user equipment and a timestamp corresponding to a time when a reported event of the radio failure report occurred;
collect a plurality of private data reports, each comprising a cell radio network temporary identifier of a corresponding user equipment, wherein first trace jobs for collecting the plurality of private data reports are separate from second trace jobs for collecting the radio failure reports, making the radio failure reports and private data reports separate and initially unassociated upon reception; and
determine which radio failure report and private data report from the plurality of radio failure reports and private data reports are from a same user equipment based on the received cell radio network temporary identifiers and the timestamps;
wherein the cell radio network temporary identifier is a last cell radio network temporary identifier before the time when the reported event of the radio failure report occurred.

10. The apparatus of claim 9, wherein the radio failure reports comprise at least one of radio link failure reports, handover failure reports, or radio resource control connection establishment failure reports.

11. The apparatus of claim 9, wherein the private data reports comprise at least one of minimization of drive test reports or measurement logs.

12. The apparatus of claim 9, wherein the at least one memory and the computer program code are configured to, with the at least one processor, cause the apparatus at least to collect the plurality of radio failure reports by adding to a log file at least one of a user equipment identifier or a cell radio network temporary identifier.

13. The apparatus of claim 9, wherein the at least one memory and the computer program code are configured to, with the at least one processor, cause the apparatus at least to collect the plurality of private data reports by adding at least one cell radio network temporary identifier or at least one user equipment identifier to a log file.

14. An apparatus, comprising:
at least one processor; and at least one memory including computer program code,
wherein the at least one memory and the computer program code are configured to, with the at least one processor, cause the apparatus at least to
provide, by a user equipment, a radio failure report to a core network element; provide a private data report to the core network element, the private data report comprising a cell radio network temporary identifier of the user equipment, wherein the radio failure report and the private data report are configured to be correlated with one another at the core network element in order to determine which radio failure report and private data report from the plurality of radio failure reports and private data reports are from a same user equipment based on the received cell radio network temporary identifiers and the timestamps, wherein the radio failure report and the private data report are collected in separate trace jobs, making the radio failure reports and private data reports separate and initially unassociated upon reception at the core network element;
wherein the cell radio network temporary identifier is a last cell radio network temporary identifier before the time when the reported event of the radio failure report occurred.

15. The apparatus of claim 14, wherein the at least one memory and the computer program code are configured to, with the at least one processor, cause the apparatus at least to provide the radio failure report by providing a user equipment identifier, the user equipment identifier corresponding to the time when the reported event of the radio failure report occurred.

16. The apparatus of claim 14, wherein the radio failure report comprises at least one of a radio link failure report, a handover failure report, or a radio resource control connection establishment failure report.

17. The method of claim 1, wherein the private data reports comprise reports that require user consent before data collection or use.

18. The method of claim 1, wherein the correlating comprises correlating the at least one of the radio failure reports to the at least one of the private data reports based on identification information of corresponding user equipment and/or time of an associated radio link failure event.

19. The method of claim 1, wherein the correlating comprises matching at least one of the at least one of the radio failure reports to at least one of the at least one of the private data reports, as corresponding to a same event.

* * * * *